United States Patent [19]

Stumm

[11] 4,365,736
[45] Dec. 28, 1982

[54] METHOD OF MANUFACTURING HIGH STABILITY JOINT

[76] Inventor: James E. Stumm, 4983 Southcrest Ave., San Diego, Calif. 92110

[21] Appl. No.: 257,702

[22] Filed: Apr. 27, 1981

Related U.S. Application Data

[62] Division of Ser. No. 84,106, Oct. 12, 1979, Pat. No. 4,330,221.

[51] Int. Cl.³ .............................................. B23K 31/02
[52] U.S. Cl. ..................................... 228/121; 228/135
[58] Field of Search ............... 228/121, 124, 135, 242; 403/270, 271, 272

[56] References Cited

U.S. PATENT DOCUMENTS

| | | | |
|---|---|---|---|
| 1,795,589 | 3/1931 | Zolla | 403/217 |
| 2,071,809 | 2/1937 | Anderson | 403/172 |
| 2,671,539 | 3/1954 | Kiefer | 403/270 |
| 3,325,199 | 6/1977 | Cole | 403/271 X |
| 4,019,388 | 4/1977 | Hall et al. | 228/124 X |
| 4,033,668 | 7/1977 | Presby | 403/272 X |
| 4,061,263 | 12/1977 | Ohlstein | 228/124 |
| 4,077,558 | 3/1978 | Carlson et al. | 228/121 |
| 4,255,475 | 3/1981 | DelGrande | 228/121 X |

FOREIGN PATENT DOCUMENTS

| | | | |
|---|---|---|---|
| 53-14638 | 2/1978 | Japan | 228/135 |
| 883483 | 11/1961 | United Kingdom | 403/173 |

Primary Examiner—Gil Weidenfeld
Assistant Examiner—Fred A. Silverberg
Attorney, Agent, or Firm—Frank D. Gilliam

[57] ABSTRACT

A structural joint wherein the intersecting members share at least one uninterrupted common surface to provide a particularly stable joint. In the preferred embodiment the composite material elements are protectively coated to prevent moisture absorption, and this coating is later utilized to bond the elements together to form the joint.

6 Claims, 3 Drawing Figures

4,365,736

METHOD OF MANUFACTURING HIGH STABILITY JOINT

This is a division of application Ser. No. 084,106, filed Oct. 12, 1979, now U.S. Pat. No. 4,330,221.

BACKGROUND OF THE INVENTION

The invention relates to open structures and more particularly to the joints of such structures wherein a plurality of intersecting structural members are joined together in a novel way for form a highly stable joint.

When a plurality of structural members intersect at a common point it is usual practice to employ a structural fitting to accommodate the connection of these members one to another. Such a fitting concentrates material and weight at the intersection and alters the structural cross-section of the members at the intersection. For example, in the case of a plurality of intersecting tubular members, the joint fitting may comprise a cast or forged spider of intersecting male plugs adapted for insertion within the inside diameter of each of the tubular members and fastened thereto by means of rivets, bolts, or welding to form a joint wherein all structural member axes converge at one point. In other applications the fitting may comprise a plurality of female bores adapted for receiving the outside diameters of the tubular members and fastened thereto to form a joint. In either case the structural continuity of the members was interrupted by the joint fitting and the cross-section of the member was either increased or decreased. In other instances the tubular members may be squeezed flat at the end and these flat ends joined together by means of bolts, welding or other suitable means.

I-beam and channel section members may be interconnected by means of splice caps which overlay and are attached to the cap portions of the intersecting members, and the web portions connected together by means of clips or brackets. In such joints the cap section has good carry thru, but the webs are totally interrupted and only the clips provide web interconnection.

Thus, it may be seen that even though various shaped cross-section structural members may be used to produce highly efficient structures, maximum structural simplicity and efficiency have not been obtained primarily because of the complexity of joints. Difficulties have continued to exist in developing a highly efficient method of joining intersecting structural members at a common joint. This is particularly true in composite structures wherein the fiber continuity and orientation, upon which performance depends, are seriously compromised in the area of intersections or joints.

SUMMARY OF THE INVENTION

The present invention relates to open structural frameworks or trusses, and more particularly to truss joint arrangements which emphasize stability and stiffness while efficiently maintaining strength and weight.

One of the objects of the invention is to provide a structural joint wherein at least one surface of each of the intersecting members is uninterrupted and common to all intersecting members in the vicinity of the intersection. Such an arrangement provides an extremely stiff joint because of the uninterrupted common surface. Additionally, such an arrangement provides a geometric reference to a real surface, as opposed for example to the center line of a tube, thereby permitting accurate dimensions of the structure to be determined and permitting the use of simpler tooling during manufacture.

Another object of the invention is to provide a structural joint wherein individual elements of the structural members may be protectively coated prior to assembly thereby eliminating blind areas, such as for example the interior of box beams. Such an arrangement also provides a more constant thickness of the coating at fillets and edges than is possible to obtain on previously made-up structural shapes. Additionally, such an arrangement allows smaller volume facilities and less complex equipment to be utilized in the coating process.

Another object of the invention is to provide a method of bonding the elements together by means of the protective coating and thereby eliminate the coating of bond fillets which exist in previously made-up sections, and which are the usual sites of coating rejection and pitting. Additonally, because the edges of the material are individually coated each element is isolated which thereby reduces the influence of any pitting or micro yields of the bonded joint.

The above and other objects are accomplished with the present invention by employing at least one common surface to the intersecting structural members in a new and novel joint that may be protectively coated prior to assembly, and the protective coating utilized to bond the individual parts together. The advantages of the present invention may be more clearly understood from a consideration of the following description taken together with the accompanying drawings wherein a preferred embodiment of the invention made from composite materials is shown by way of example, it being understood for purposes of illustration only since other materials and arrangements may also be utilized, and such drawings and description are not to be construed as limiting the scope of the invention.

DESCRIPTION OF THE DRAWINGS

In the drawings, wherein like numbers designate like parts throughout the several views.

DESCRIPTION OF A PREFERRED EMBODIMENT

Figure 1:
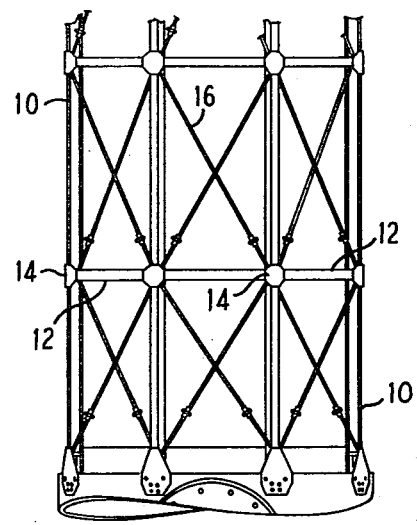
FIG. 1 illustrates a typical prior art open structural framework.

Referring now to the drawings in detail, FIG. 1 illustrates a portion of a typical prior art truss structure wherein a plurality of eight-member structural intersections may be seen. The structure illustrated is a portion of a telescope having mirrors and/or lenses supported at opposite ends. It may be appreciated that such a structure must have stiff structural joints in order to provide the rigid optical alignment that is required of the mirrors and/or lenses mounted at the structure ends. The structure is a cylindrical truss having a plurality of circumferentially spaced longitudinal extending I-beams 10 which extend uninterrupted the full length of the structure. The truss is provided intermediate its ends with a plurality of transverse reinforcing rings made up of I-beam portions 12 extending between adjacent longitudinal I-beams 10. Each of these transverse I-beams 12 are shaped at opposite ends to conform with and to substantially interfit the I-beams 10 so they may be assembled and welded thereto. At each of the joints between the I-beams 10 and I-beam portions 12 and located externally of the truss there are octagonal reinforcing plates 14 welded to the caps of I-beam 10 and the I-beam portions 12.

In order to give the truss the necessary additional rigidity and strength, a plurality of diagonal tie rods 16 are employed. The tie rods 16 have their ends turned inwardly to lie against the webs of the I-beams 10 and I-beam portions 12 and are welded thereto. It should be understood that the diagonal members could also be I-beams such as beams 10 and ring portions 12 instead of the tie rods 16, however this particular prior art structure will serve to illustrate one type of eight-element intersection or joint, which is one of the more complex structural joints found in truss structures.

Figure 2:
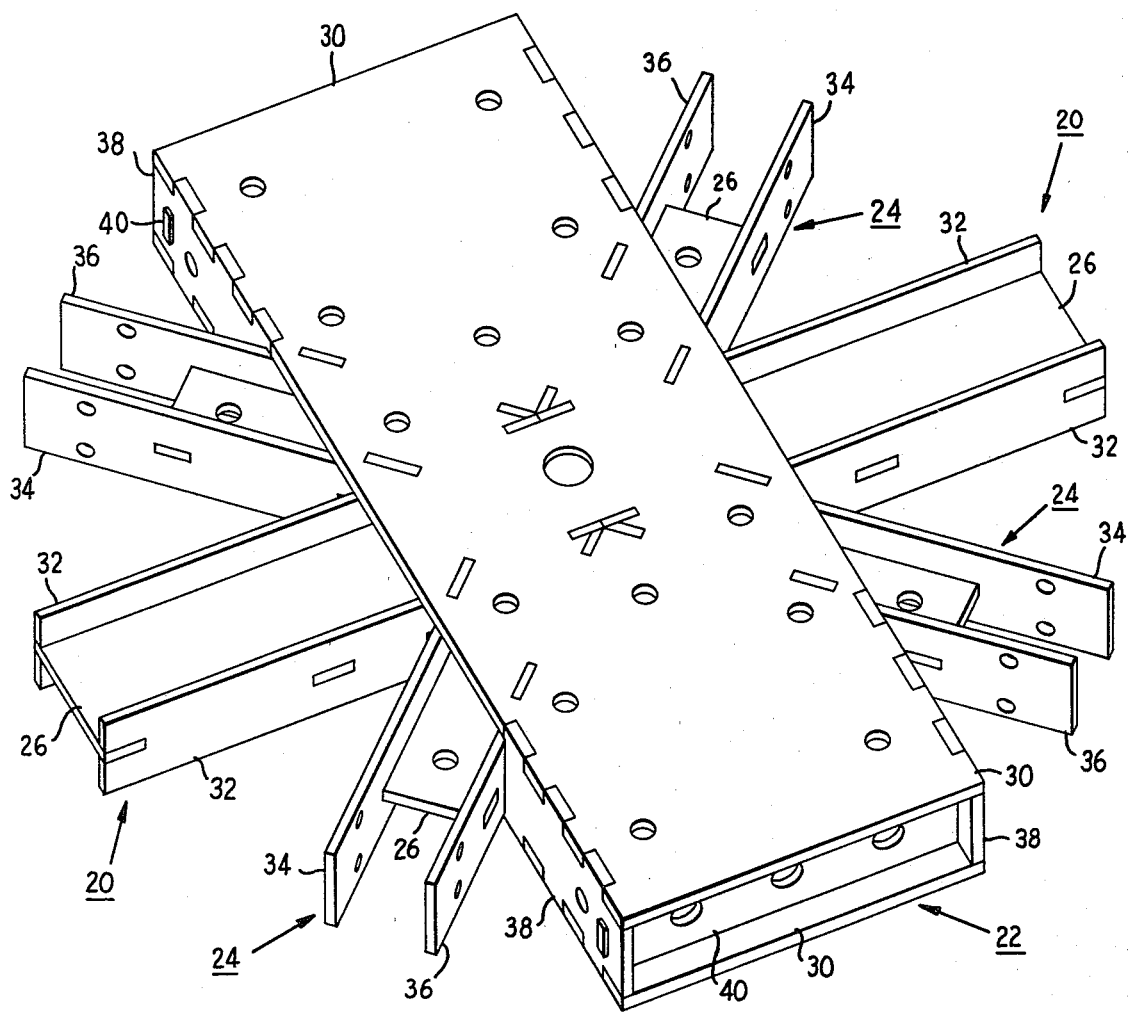
FIG. 2 is an outside view of the invention as employed in an eight-member joint.
Figure 3:
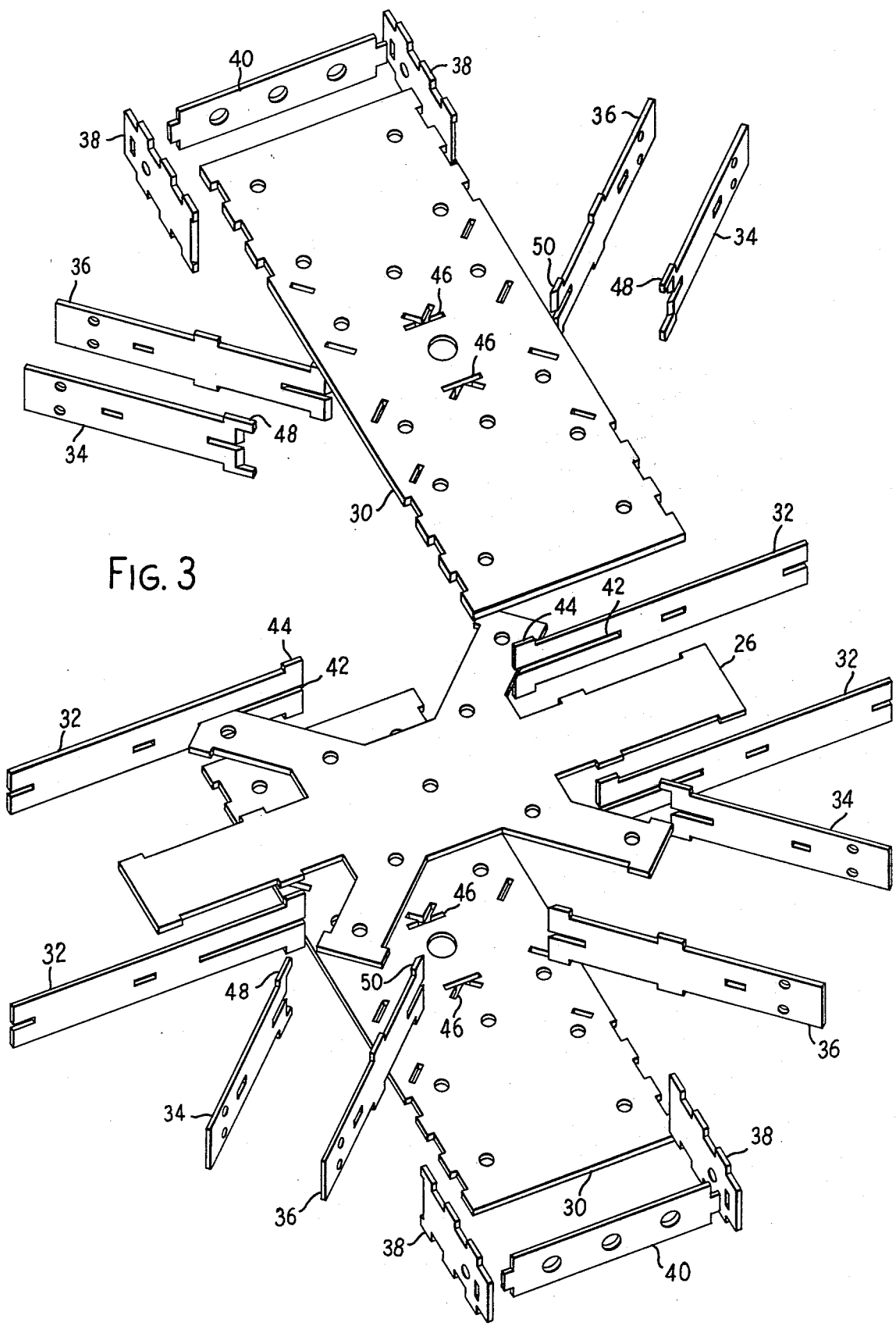
FIG. 3 is an exploded view showing the individual parts comprising the joint of FIG. 2.

Referring now to FIGS. 2 and 3 there is illustrated an eight-member truss joint which has been selected as a preferred embodiment for purposes of describing the invention. For example, the I-beam assembly 20 may represent the longitudinal I-beam 10 of the structure shown in FIG. 1, while the box beam structure 22 may represent the transverse ring made of I-beam portions 12 in FIG. 1, and the diagonal I-beams 24 may represent the diagonal tie rods 16 in FIG. 1. Additionally, for purposes of description only, the preferred embodiment is shown with all intersecting members lying within a common flat plane and the members made of composite materials.

It will be observed that the stability and material continuity of the joint is provided by the web 26 which is the web for longitudinal I-beam 20 and diagonal I-beams 24, and is therefore a surface which is common to six of the eight members. The transverse ring 22 could also be an I-beam, picking up the web 26 and thereby yield a joint wherein web 26 is common to all eight members, however in order to illustrate the ability of the invention to utilize other structural shapes the transverse ring 22 is shown as a box beam. The top and bottom caps 30 of box beam 22 each pick up the cap edges of longitudinal I-beam 20 and diagonal I-beams 24 to locally stabilize the beam caps and to complete the rigidity of the joint. If all eight members of the joint were box beams, then the box beam caps 30 would extend down the diagonal I-beams 24 and longitudinal I-beam 20 substantially the same as web 26 does in the I-beam arrangement shown.

The longitudinal I-beam 20 comprises four cap pieces 32 attached to the edges of the longitudinal legs of common web 26, and each of the four diagonal beams 24 comprise a cap piece 34 and a cap piece 36 attached to opposite edges of each of the diagonal legs of common web 26. Each of the pieces as shown in FIGS. 2 and 3 is made from flatstock composite material such as graphite fiber or glass fiber reinforced resin for example. Additionally, it will be observed that extensive interlocking and dovetailing of individual pieces is employed by means of tabs and slots in mating pieces. In addition to the increased strength to the bonded joints that this interlocking provides, there is the self fixturing feature that is utilized to hold each piece in proper relationship during the bonding process.

Clearly, such interlocking of parts is not required where the individual pieces are made of metal and are welded together, or where web 26 is metal or plywood and the cap members are timbers nailed to opposite sides of the web 26 for example. Likewise in many uses where the individual pieces are made of plastic or reinforced plastic and glued or bonded together the interlocking tabs and slots may not be required if sufficient tooling is available to properly hold the individual pieces in their proper relationship during the glueing or bonding process.

In the preferred embodiment the composite flatstock material is machined by means of a template following router to form the exterior shape, and the slots are then formed by means of an end-mill or slot-mill. The long slot 42 in cap piece 32 permits the web 26 to fit therein and allows cap pieces 32 to be fitted on the web 26 from opposite ends and slid together until they butt join. The end tabs 44 on cap pieces 32 will then match a portion of the cutout 46 in box beam cap 30. The cut-out 46 is shaped to fit four tabs, the two tabs 44 as described plus tab 48 of cap piece 34 and tab 50 of cap piece 36. Thus it may be seen that after the four cap pieces 32 have been assembled on web 26 to form the longitudinal I-beam 20, and the four cap pieces 34 and four cap pieces 36 have been located on web 26 to form the four longitudinal I-beams 24, the upper and lower box beam caps 30 may be located above and below the intersecting I-beams and brought into mating contact by means of the plurality of slots receiving the appropriate tabs located on each of the intersecting I-beam cap pieces. The box beam 22 may be completed by attaching the four box beam side pieces 38 to the top and bottom caps 30 and the insertion of the two bulkheads 40.

Many structural shapes and different materials may be utilized in constructing joints according to the present invention. For example the common web 26 may be made from plywood and a plurality of cap pieces made from timbers nailed, or otherwise fastened, on the top surface to form a joint of intersecting channel sections. By adding a second set of cap pieces made from timbers and nailed or otherwise fastened to the bottom surface of the web 26 an intersection I-beams is formed. By utilizing two webs 26 to form the top and bottom sides, an intersection of a plurality of box beams may be constructed. Other structural shapes, such as Z-sections and double box beams for example, may be constructed from any suitable material such as metal, wood, or plastic for example using welding, nailing, glueing, and riveting for example as a means for fastening.

The present invention has as one of its objectives to provide a structural joint that is dimensionally stable, and in the preferred embodiment the joint comprises members made of a composite material such as a reinforced resin plastic. Such composite materials are hydroscopic, that is they tend to absorb moisture from the environment. This may cause small dimensional changes in the structure as it gains and looses moisture. To prevent the entrance of moisture it is necessary to seal the composite structure with a coating that is impervious to moisture. Metal coatings are very desireable for this purpose.

It has been found difficult to metal coat the inside and outside surfaces of tubes and box beams with a constant thickness coating, and it is also difficult to obtain constant thicknesses at the edges and fillets of common structural shape elements such as channels, Z-sections, T-sections, and I-sections. The coating is usually thick along the edges of such shapes and thin in the area of intersecting surfaces fillets. Ideally each piece of the structure should be coated while in the form of a piece of flat material, where constant coating thickness is readily obtainable, and thereafter joined together to form the desired structural shape. By coating the flat pieces with solder one may later bond the flat pieces together by reflowing the solder in the joint area.

After the pieces are machined, sawed, or stamped from composite flatstock they are given a surface abrasion or chemical etch. Surface abrasion may comprise a light sanding with 400 grit paper, scrubbing with abrasive cleaner, or light sandblasting. The pieces are then immersed in an electroless nickel plating solution for approximately twenty minutes, with mechanical agitation and the solution maintained at approximately 170° F. The nickel coating thickness should be from 0.1 to 0.3 mil. A wetting coat of electroless gold or tin is next applied over the nickel coating by immersing in the appropriate plating solution for approximately five minutes. The pieces are then placed in a vacuum oven held at or below $5 \times 10^{-2}$ torr at 180° to 190° F. for a minimum of 72 hours. The final seal coat is applied within 45 minutes of removal from the vacuum oven.

The final seal coat is molten solder which is flowed over the piece while the piece is suspended in an acidified ethylene glycol solution. The piece is then rinsed, dried, and stored in a dry atmosphere until bonding.

Bonding of the individual pieces is accomplished by fitting the pieces together with tabs fully engaged in mating slots and then locally heating the mating surface areas with a heat gun. Another method is to insert the assembly in an oven and heat the assembly unit the solder reflows. Thus it may be seen that each of the cap pieces, such as 32, 34 and 36 and common web 26 are individually sealed on all surfaces including the edges, and therefore even if a local crack or void in the bond joint between individual pieces should exist, the pieces would remain sealed from moisture by means of their individual seal coats. Such an arrangement eliminates seal coating of adhesive fillets at the intersection of joined pieces where seal coat rejection and pitting usually occur, and where, should a local crack develop, the seal would be broken. Additionally the blind areas on the inside surfaces of box beam 22 were coated prior to assembly and seal continuity inspected prior to assembly, giving confidence in the seal coat with a sealing process that is much more economical and requires less tank volume than would be required for sealing the assembled box beam.

Thus it may be seen that the objectives of the invention have been met by a new and novel structural joint wherein all or a majority of all intersecting members share at least one common surface to yield a particularly stable joint. Stability of the joint is further enhanced in the preferred embodiment by employing a low thermal expansion isotropic reinforced plastic such as a graphite epoxy laminate, and further by protectively metal coating the individual pieces to prevent dimensional changes caused by moisture absorption, and utilizing this metal coating to bond the individual pieces together to thereby form the structural joint. Since other features, arrangements, and advantages will occur in other embodiments of the invention, the invention should not be considered limited only to the preferred embodiment herein set forth. Other variations and modifications of the preferred embodiment will occur to those skilled in the art without departing from the spirit and scope of the invention as claimed.

Having described my invention so that others skilled in the art may clearly understand it, I claim:

1. A method for joining a plurality of structural elements having tabs and slots thereon to form a structural member comprising the steps of:
   (a) coating each element with an electoless nickel plating;
   (b) coating said nickel plating with a wetting coat selected from a group of electroless coatings consisting of tin and gold;
   (c) flowing molten solder over said wetting coat while said element is suspended in an acidified ethylene glycol solution;
   (d) interlocking said elements together with the tabs of one element engaged in mating slots of the other element to form said structural member; and
   (e) heating the mating surfaces of the interlocked surfaces to reflow the solder sufficiently to obtain a structural bond.

2. The method as defined in claim 1 including the additional step of preparing the surface of said elements to receive a plating prior to step (a).

3. The method as defined in claim 1 including mechanically agitating the nickel plating during step (a).

4. The method as defined in claim 3 including elevating the temperature of the nickel plating solution to approximately 170° F. during step (a).

5. The method as defined in claim 1 including placing the elements in a vacuum oven for at least 72 hours at at least $5 \times 10^{-2}$ tor and elevating the oven temperature to a range of from 180° to 190° F. between steps (b) and (c).

6. The method as defined in claim 5 including performing step (c) within 45 minutes of the removal of the elements from the vacuum oven.

* * * * *